UNITED STATES PATENT OFFICE 2,689,831

DETECTOR FOR LEWISITE

Bernard Gehauf, Baltimore, Md., and Melvin M. Falkof, United States Army, assignors to the United States of America as represented by the Secretary of War No Drawing. Application February 8, 1945, Serial No. 576,871

1 Claim. (Cl. 252—408)

(Granted under Title 35, U. S. Code (1952), sec. 266)

The invention described herein may be manufactured and used by or for the Government, for governmental purposes, without payment to us of any royalty thereon.

This invention relates to a device and method for the detection of lewisite (chlorovinyldichlorarsine) and its vapors. An object of this invention is to provide a specific, direct and simple device and method suitable for use in the field by inexpert personnel, as well as suitable for use under other circumstances.

In principle, the invention depends upon the fact that lewisite upon contact with strong alkali generates acetylene, which in turn can react with a cuprous salt to form brownish-red cuprous acetylide. While the formation of the acetylide has been well known, up until the present there has been no knowledge of how to obtain the reaction of lewisite with strong alkaline solutions containing stable cuprous ions in one step.

In accordance with the present invention, it was determined that a most suitable reagent solution for obtaining the desired color reaction comprises stabilized cuprous ions in an aqueous alkaline solution, more particularly cuprous oxide in an aqueous solution of sodium arsenite and sodium hydroxide. This reagent produces a brownish-red color upon contact with lewisite. Addition of piperidine to this solution causes a brilliant red coloration with lewisite, which result is advantageous on account of the brilliance of the test color.

A satisfactory reagent solution of the type described is prepared as follows:

| | | |
|---|---|---|
| Cupric carbonate | g | 0.2 |
| Arsenious oxide | g | 6.0 |
| Sodium hydroxide | g | 12.0 |
| Piperidine | ml | 1.0 |
| Distilled water | ml | 100.0 |

To prepare the reagent, first grind together in a mortar or the like the cupric carbonate and arsenious oxide a reducing and solubilizing agent adapted to convert the cupric carbonate to cuprous oxide and solubilize the oxide in alkaline solutions. Place the mixed powder in a container with the sodium hydroxide and add the water. Heat is generated and the material dissolves to a blue color which will rapidly fade out. When colorless, the solution is allowed to cool and to it is added the piperidine for the sole purpose of sharpening the end point of the solution. Alternately, the piperidine can be added to the dry powdered cupric carbonate and arsenious oxide in the form of 1.2 g. piperidine hydrochloride.

Lewisite liquid can be distinguished by the bright red color and fuming produced when the above solution is brought in contact with it. Lewisite oxide upon contact with the above liquid does not fume, but produces a red color.

For a simple and highly useful test liquid, when vapors are absorbed on silica gel and the silica gel is then wet with the described type of reagent, a red color is produced.

Alternatively, if silica gel impregnated with copper sulfate is exposed to lewisite vapors and then treated with sodium hydroxide solution containing a reducing agent, such as hydroxylamine, a test color is developed.

The test color may be developed also by using ordinary caustic solution if the silica gel is impregnated with cuprous salt, such as cuprous iodide.

In place of using two separate reagents for detection of lewisite a practical single reagent may be made by combining a cuprous compound with an alkaline solution of a solubilizing agent, as for example, cuprous iodide, with sodium hydroxide and sodium thiosulfate or sodium arsenite in aqueous solution. Such a solution is useful particularly in detecting and estimating very small concentrations of lewisite in air. The test solution may be used in a gas scrubber through which is passed any desired amount of air containing the small concentrations of lewisite.

Although specific examples have been given of certain types of reagents to illustrate the invention, it is to be understood other types and modifications come within the spirit and scope of the invention as defined in the appended claim.

We claim:

A detector for lewisite consisting of in admixture from about 1.5 parts to about 2.5 parts of cupric carbonate, from about 50.0 parts to about 70.0 parts arsenious oxide, from about 100 parts to about 140 parts sodium hydroxide, from about 7.5 parts to about 1.5 parts piperidine and about 1000 parts of distilled water.

References Cited in the file of this patent

UNITED STATES PATENTS

| Number | Name | Date |
|---|---|---|
| 1,924,185 | Gollmar | Aug. 29, 1933 |
| 2,054,885 | Schroter | Sept. 22, 1936 |
| 2,228,295 | Yabroff | Jan. 14, 1941 |
| 2,245,719 | Robey | June 17, 1941 |
| 2,315,480 | Border | Mar. 30, 1943 |
| 2,418,033 | Kamlet | Mar. 25, 1947 |
| 2,423,688 | Day | July 8, 1947 |

FOREIGN PATENTS

| Number | Country | Date |
|---|---|---|
| 345,672 | Great Britain | Mar. 23, 1931 |